United States Patent [19]
Kenny

[11] Patent Number: 5,673,400
[45] Date of Patent: Sep. 30, 1997

[54] METHOD AND APPARATUS FOR IDENTIFYING AND CONTROLLING A TARGET PERIPHERAL DEVICE IN A MULTIPLE BUS SYSTEM

[75] Inventor: John D. Kenny, Sunnyvale, Calif.

[73] Assignee: National Semiconductor Corporation, Santa Clara, Calif.

[21] Appl. No.: 478,579

[22] Filed: Jun. 7, 1995

Related U.S. Application Data

[63] Continuation-in-part of Ser. No. 466,627, Jun. 6, 1995.

[51] Int. Cl.$^6$ .................................. G06F 9/46; G06F 13/38
[52] U.S. Cl. .......................... 395/309; 395/308; 395/733
[58] Field of Search ................................ 395/306–309, 395/733, 741, 737, 281, 821, 868, 800

[56] References Cited

U.S. PATENT DOCUMENTS

| | | | |
|---|---|---|---|
| 5,134,706 | 7/1992 | Cushing et al. | 395/741 |
| 5,142,672 | 8/1992 | Johnson et al. | 395/500 |
| 5,146,572 | 9/1992 | Bailey et al. | 395/425 |
| 5,162,675 | 11/1992 | Olsen et al. | 307/465 |
| 5,163,833 | 11/1992 | Olsen et al. | 439/61 |
| 5,191,657 | 3/1993 | Ludwig et al. | 395/325 |
| 5,218,681 | 6/1993 | Gephardt et al. | 395/281 |
| 5,263,172 | 11/1993 | Olnowich | 395/800 |
| 5,287,460 | 2/1994 | Olsen et al. | 395/275 |
| 5,301,281 | 4/1994 | Kennedy | 395/325 |
| 5,309,568 | 5/1994 | Ghosh et al. | 395/325 |
| 5,353,423 | 10/1994 | Hamid et al. | 395/425 |
| 5,367,689 | 11/1994 | Mayer et al. | 395/733 |
| 5,369,748 | 11/1994 | McFarland et al. | 395/325 |
| 5,371,880 | 12/1994 | Bhattacharya | 395/550 |
| 5,379,386 | 1/1995 | Swarts et al. | 395/325 |
| 5,386,517 | 1/1995 | Sheth et al. | 395/275 |
| 5,388,227 | 2/1995 | McFarland | 395/325 |
| 5,414,814 | 5/1995 | McKim | 395/821 |
| 5,434,983 | 7/1995 | Yaso et al. | 395/290 |
| 5,555,430 | 9/1996 | Gephardt et al. | 395/800 |

*Primary Examiner*—Gopal C. Ray
*Attorney, Agent, or Firm*—Robert Platt Bell & Associates, P.C.

[57] ABSTRACT

An apparatus and method for controlling devices in a multiple bus system such as a system having two or more ISA type buses. Separate ISA bus controllers may be provided for each ISA bus, linked on a common bus system such as a PCI bus. One ISA controller may be designated as a primary ISA controller whereas other ISA controllers in the system may be designated as secondary ISA controllers. Each ISA controller in the system is provided with IRQ (interrupt request) enable bits to enable different interrupts for the corresponding ISA bus. Each secondary ISA controller outputs a signal IRQSER as a PCI sideband signal to the primary ISA controller to indicate which IRQs have been asserted on the respective ISA buses. The primary controller receives the IRQSER signal as well as the IRQ signals asserted on its own bus and converts these interrupt requests to PCI bus cycles. The primary bus controller may further provide a bit mask indicating which of a number of direct memory access channels are enabled for the primary bus controller. The primary controller receives direct memory access requests from the second bus system and generates a read or write cycle on the first bus system corresponding to outputs requests enabled by the bit mask.

18 Claims, 5 Drawing Sheets

METHOD AND APPARATUS FOR IDENTIFYING AND CONTROLLING A TARGET PERIPHERAL DEVICE IN A MULTIPLE BUS SYSTEM

CROSS-REFERENCE TO RELATED APPLICATIONS

This application is a Continuation-In-Part (CIP) of copending U.S. application Ser. No. 08/466,627 filed Jun. 6, 1995.

The subject matter of this application is also related to that in copending U.S. application Ser. No. 08/130,090 filed Sep. 30, 1993 entitled "Automatic Bus Setting, Sensing and Switching Interface Unit" and incorporated herein by reference.

FIELD OF THE INVENTION

The present invention relates to an apparatus and method for identifying and controlling a target peripheral device in a multiple bus system. The invention has particular application in to computer systems containing multiple ISA buses.

BACKGROUND OF THE INVENTION

Over a decade ago the IBM™ PC AT set the standard for the burgeoning personal computer (PC) industry. Today, IBM™ compatible architectures make up approximately 90% of the PC marketplace. Along side the tremendous growth of the PC market itself there has also grown up a very large market for add-on peripheral devices of all types. Because of the dominance of the IBM PC AT architecture, its peripheral bus, the so-called "AT" or "ISA" (Industry Standards Association) bus has become the dominant standard for connecting add-on peripheral devices to a PC system. The operation of ISA bus type computer systems is described in more detail in ISA System Architecture (New Revised Edition) by Tom Shanley and Don Anderson (©1991 and 1993, Mindshare Press, 2202 Buttercup Drive, Richardson, Tex. 75802, ISBN 1-881609-05-7) and incorporated herein by reference.

After more than ten years in use, however, the limitations of the ISA bus have caused a growing movement to define newer, more advanced peripheral buses. Two of the largest drawbacks to the ISA bus are is low level of performance, by today's standards, and that it may be very difficult to configure peripheral devices on an ISA bus as they give no explicit indication of their presence in the system or of their support requirements.

At present, the recently defined advanced peripheral bus, the so-called "PCI" bus is gaining momentum and looks likely to become the standard peripheral bus for a next generation of PCs. The operation of PCI bus type computer systems is described in more detail in *PCI System Architecture* (New Expanded Edition Rev 2.0 Compliant) by Tom Shanley (©1993, Mindshare Press, 2202 Buttercup Drive, Richardson, Tex. 75802, ISBN 1-881609-08-1) and incorporated herein by reference. However, new bus designs, such as the PCI bus, may have substantial obstacles and problems to overcome. Although newer bus type designs have technological advantages over the ISA bus design, there exists a large installed base of ISA bus type computers and compatible software. For the purposes of this application, these ISA bus type computers will be referred to as "legacy" computers or systems.

In order to provide a computer system which has the advantages of a new (e.g., PCI) bus design, it may be desirable to provide a computer with both PCI and ISA compatible buses. FIG. 1 illustrates an example of such a system. As shown in FIG. 1, a computer (e.g., PC, laptop, notebook or the like) may be provided with a CPU 100, a CPU interface to PCI Host controller 110 (hereinafter "PCI host controller") and a PCI bus 120. A number of peripheral devices 130,140 compatible with PCI bus architecture may be coupled to PCI bus 120. Such devices may include I/O controllers, memory, video controllers, hard drive controllers, or the like. A number of such devices may be provided coupled to PCI bus 120, however, for the purposes of illustration only two such devices 130,140 are shown here.

In addition to devices 130,140, a Primary PCI to ISA controller 150 (hereinafter "ISA controller") may be coupled to PCI bus 120. ISA controller 150 is itself a PCI bus compatible device and may be read from or written to through PCI bus 120 in a manner similar to devices 130,140. ISA controller 150 is coupled to ISA bus 160. ISA bus compatible devices 170,180 may be coupled to ISA bus 160. ISA bus compatible devices 170,180 may comprise any one of a number of peripheral devices compatible with the ISA bus architecture.

The dual bus system of FIG. 1 provides both PCI and ISA bus compatibility for both hardware and software. As the amount of Legacy hardware and software in existence is large, it is preferable to provide such a dual-bus system which is backwardly compatible.

However, the system of FIG. 1 may present some difficult hardware and software design problems. For example, the fundamental bus architecture of the ISA bus and PCI bus are different. The PCI bus is a synchronous bus, using an internal PCI bus clock to regulate the transfer of data and bus cycles. The ISA bus is an asynchronous bus architecture. Moreover, an ISA bus type computer system must be provided with direct memory access (DMA) channels and ISA type interrupt levels (IRQ) not present in the PCI type bus system. ISA controller 150 may be provided to convert ISA interrupt requests and generic ISA bus cycles into PCI compatible bus cycles, however there is no mechanism for handling DMA cycles.

While the use of such a controller may be suitable for a system having a single ISA bus, additional problems may be created if multiple ISA bus controllers are used. For example, for a portable computer, it may be desirable to provide a so-called docking station with a PCI bus interface. The docking station may be provided with a PCI to ISA bus interface controller to drive ISA bus compatible peripheral devices. If the portable computer also has an ISA to PCI bus interface controller, two ISA type buses may be present in one computer system at the same time. Since, as noted above, peripherals on an ISA system do not provide explicit indication of their presence on the ISA bus, it may be difficult to address ISA devices for read and write operations.

SUMMARY AND OBJECTS OF THE INVENTION

A multiple bus computer system includes a first bus system of a first type interfacing with a central processing unit. A primary bus controller, coupled to the first bus system controls a second bus system of a second type. At least one secondary bus controller controls at least a third bus system of a second type. The secondary bus controller receives interrupt requests from the third bus system and outputs an interrupt signal on the first bus system to the primary bus controller indicative of interrupt requests generated on the third bus system.

The primary bus controller receives the interrupt signal over the first bus system and further receives interrupt requests from the second bus and outputs a signal on the first bus system indicative of all interrupt requests on the second bus system and the third bus system. The interrupt signal may comprises one or more pulses in a timed relationship indicating the presence of an interrupt request level.

The primary or secondary bus controller may also include a bit mask indicating which of a number of interrupt request levels are enabled for the bus controller. The bus controller receives interrupt requests its bus and generates an interrupt signal on the first bus system for those interrupt levels enabled by the masking means.

It is an object of the present invention to provide a means for centralizing interrupt (IRQ) requests from multiple buses.

It is a further object of the present invention to generate interrupt requests on a host bus from one or more interrupt requests from multiple bus systems.

It is a further object of the present invention to handle direct memory access (DMA) across a PCI bus in a system including multiple buses.

It is a further object of the present invention to handle direct memory access (DMA) from multiple buses through a host bus which may not recognize direct memory access.

BRIEF DESCRIPTIONS OF THE DRAWINGS

DETAILED DESCRIPTION OF THE INVENTION

Figure 2:
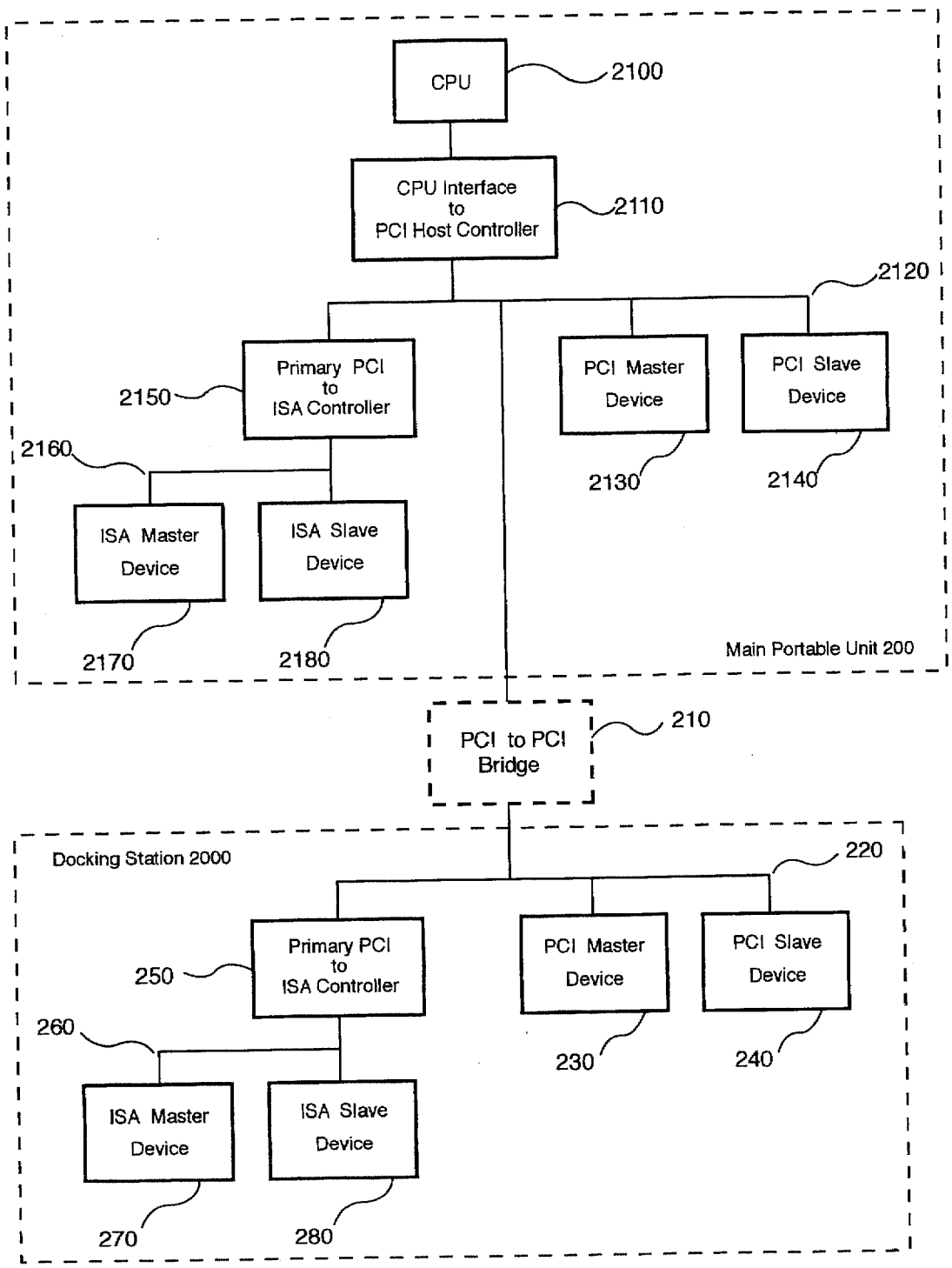
FIG. 2 is a block diagram illustrating a computer with two ISA buses as used, for example, in a portable computer combined with a docking station.

FIG. 2 is a block diagram illustrating a computer with two ISA buses as used, for example, in a portable computer combined with a docking station. While illustrated here for use with a portable computer and docking station, the present invention may be similarly applied to other computer systems where more than one bus of the same type may be employed, without departing from the spirit and scope of the invention.

Figure 1:
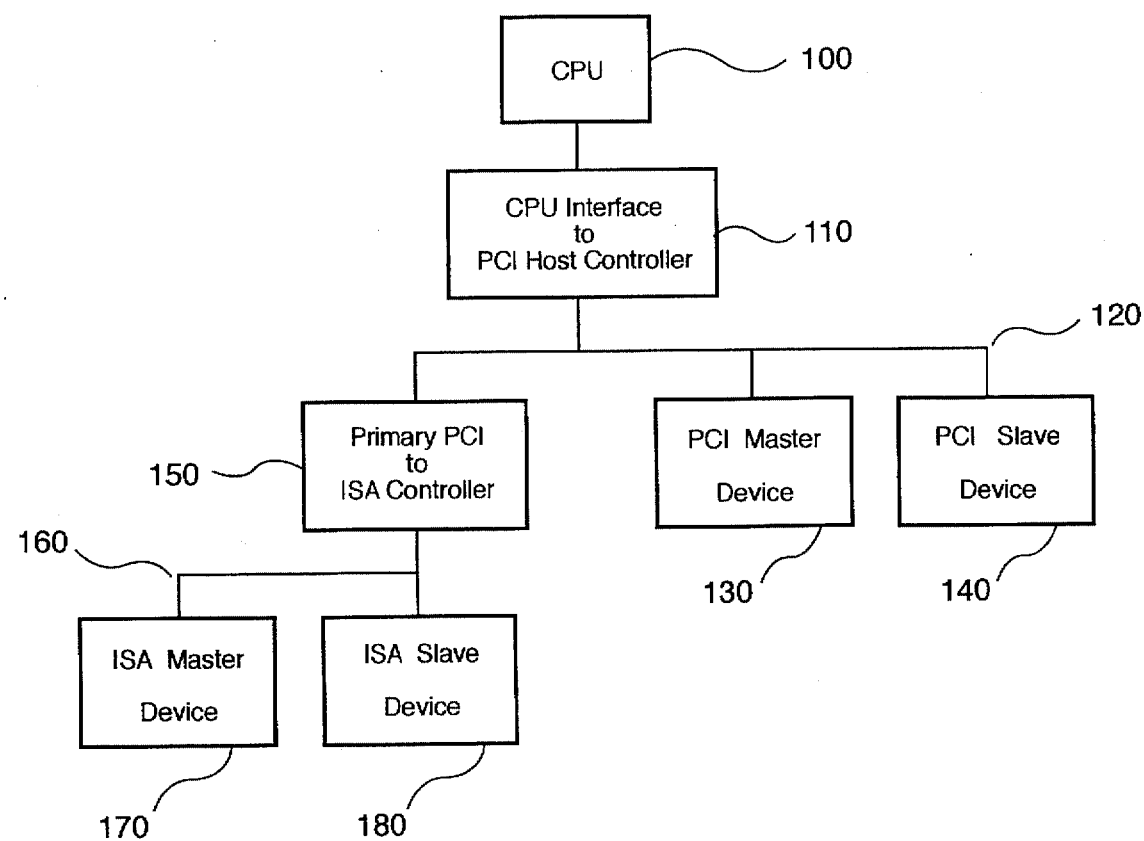
FIG. 1 is a block diagram illustrating a prior art combined bus system with an ISA to PCI bus interface controller.

Main portable unit 200 may be constructed in a manner similar to that of the dual-bus computer of FIG. 1. Main portable unit 200 may be provided with a CPU 2100, a CPU interface to PCI Host controller 2110 (hereinafter "PCI host controller") and a PCI bus 2120. A number of peripheral devices 2130,2140 compatible with PCI bus architecture may be coupled to PCI bus 2120. Such devices may include I/O controllers, memory, video controllers, hard drive controllers, or the like. A number of such devices may be provided coupled to PCI bus 2120, however, for the purposes of illustration only two such devices 2130,2140 are shown here.

In addition to devices 2130,2140, a Primary PCI to ISA controller 2150 (hereinafter "ISA controller") may be coupled to PCI bus 2120. ISA controller 2150 is itself a PCI bus compatible device and may be read from or written to through PCI bus 2120 in a manner similar to devices 2130,2140. ISA controller 2150 is coupled to ISA bus 2160. ISA bus compatible devices 2170,2180 may be coupled to ISA bus 2160. ISA bus compatible devices 2170,2180 may comprise any one of a number of peripheral devices compatible with the ISA bus architecture.

It should be noted that ISA controller 2150 may be configured in different manner than ISA controller 150 of FIG. 1 in order to provide the bus control techniques of the present invention, as will be discussed in more detail below.

A docking port comprising PCI bridge 210 may be provided between main portable unit 200 and docking station 2000. A docking port may connect a portable PC to a docking station which provides peripheral expansion and extended interconnect capabilities not typically available on Main portable unit 200. A logical choice for a docking port interface is the PCI bus because of its higher performance and lower pin count.

PCI bridge 210 couples PCI bus 2120 within main portable unit 200 to PCI bus 220 in docking station 2000, forming one contiguous PCI bus. Alternately, PCI bus 2120 and PCI bus 220 may be formed as separate, discrete buses. As the PCI bus protocol provides that each peripheral device on the bus identify itself to the host computer, the use of plural PCI buses may not present difficulty in addressing and controlling peripheral devices.

However, peripheral devices constructed according to the ISA bus standard may not be provided with means to identify their presence to a host computer. For the purposes of this application, bus designs, such as the ISA bus, in which devices do not actively identify their presence to a host will be referred to as "passive" bus designs. Thus, if CPU 2100 is to read or write data to one of ISA devices 2170, 2180, 270 or 280, it may be necessary to know which of ISA buses 2160 or 260 that a device is coupled to.

To write data to one of devices 2170, 2180, 270 or 280, CPU 2100 may write data to both ISA controller 2150 and ISA controller 250, which in turn may write that data to their respective buses 2160 and 260. In the ISA bus standard, data written on the ISA bus during a write cycle is addressed to a particular peripheral device using an I/O address assigned to that peripheral device. Other devices having different I/O addresses ignore such data. Thus, it is possible to broadcast write data on both ISA buses 2160 and 260 and successfully communicate with a peripheral device, without specifying which of ISA buses 2160 or 260 a peripheral device is coupled to.

ISA controller 2150 may generate a signal IOCHRDY (IO channel ready) indicating whether the ISA bus read or write cycle has been completed. The signal IOCHRDY may be essentially the sum of signals ISARDY (ISA bus channel ready) from each of controllers 250 and 2150. Controller 2150, as the primary controller, may receive a ISARDY signal from secondary ISA controller 250 (and other ISA controllers, if present) and combine these signals to form PCI bus signal TRDY to output to PCI host controller 2110. Signal TRDY indicates that ISA controller 2150 has completed a PCI bus cycle.

Signal ISARDY may not be a standard PCI bus control signal according to present versions of the PCI specification. However, this signal may be transmitted as a so-called "sideband" signal, using one of a number of unused connections on the PCI bridge connector 210. If an IOCHRDY signal is not received at the end of a write cycle, ISA bridge 2150 will extend the write cycle by a number of predetermined clock cycles. The process is repeated until a read or write cycle has been completed.

For all bus cycles initiated from any source on PCI bus 2120,220 any PCI target device 2130, 2140, 230, 240 may claim the bus cycle by driving PCI bus signal DEVSEL# within four clock cycles. The device claiming the bus cycle may then claim and complete a PCI bus cycle. During that claimed bus cycle, all other devices on PCI bus 220, 2120, including ISA controllers 2150, 250 must ignore the cycle.

If a PCI write cycle times out (e.g., four clock cycles without a DEVSEL# signal) and no PCI device 2130, 2140, 230, 240 has claimed the cycle, then primary ISA controller 2150 may tentatively claim the cycle on behalf of all ISA controllers in the system (e.g., ISA controllers 2150, 250). Each ISA controller then executes the designated write cycle.

If any ISA device 2170, 2180, 270, 280 pulls low the IOCHRDY line on ISA buses 2160 or 260, then an indirect indication is given that the target peripheral device is present. The corresponding ISA controller, if not the primary controller, (e.g., ISA controller 250), may then pull low the ISARDY signal to signal primary ISA controller 2150 not to terminate the cycle at the standard ISA timeout. If the corresponding controller is primary controller 2150, signal IOCHRDY may be detected on ISA bus 2160. Whichever ISA controller detects the target peripheral device may then be responsible for terminating the PCI cycle once the ISA cycle is complete.

If no IOCHRDY signal is pulled low on either of ISA buses 2160 or 260, then either the target peripheral device is not present in the system or the target peripheral device has received its data within the default ISA cycle timing and the ISA cycle is complete. In either case, the appropriate response may be to complete the PCI cycle at the completion of the default ISA cycle. Thereby, if no target device is detected by the signal IOCHRDY on either ISA bus 2160 or 260, then after completion of ISA standard write cycle primary ISA controller 2150 may automatically complete the PCI write cycle.

Reading data from a peripheral device 2170, 2180, 270 or 280 may present some additional complications. Under ordinary circumstances, an ISA type bus is tri-stated between bus cycles. Thus, any data appearing on the data lines of the ISA bus may remain there until replaced with other data. Thus, if an attempt is made to read data from both buses 2160 or 260, the resultant data (ANDed or ORed together) would be invalid. One bus containing the addressed device may output valid data, whereas the other bus may output invalid data. CPU 2100 has no way of determining which bus is outputting invalid data or which bus is outputting valid data from the addressed peripheral device.

Figure 3:
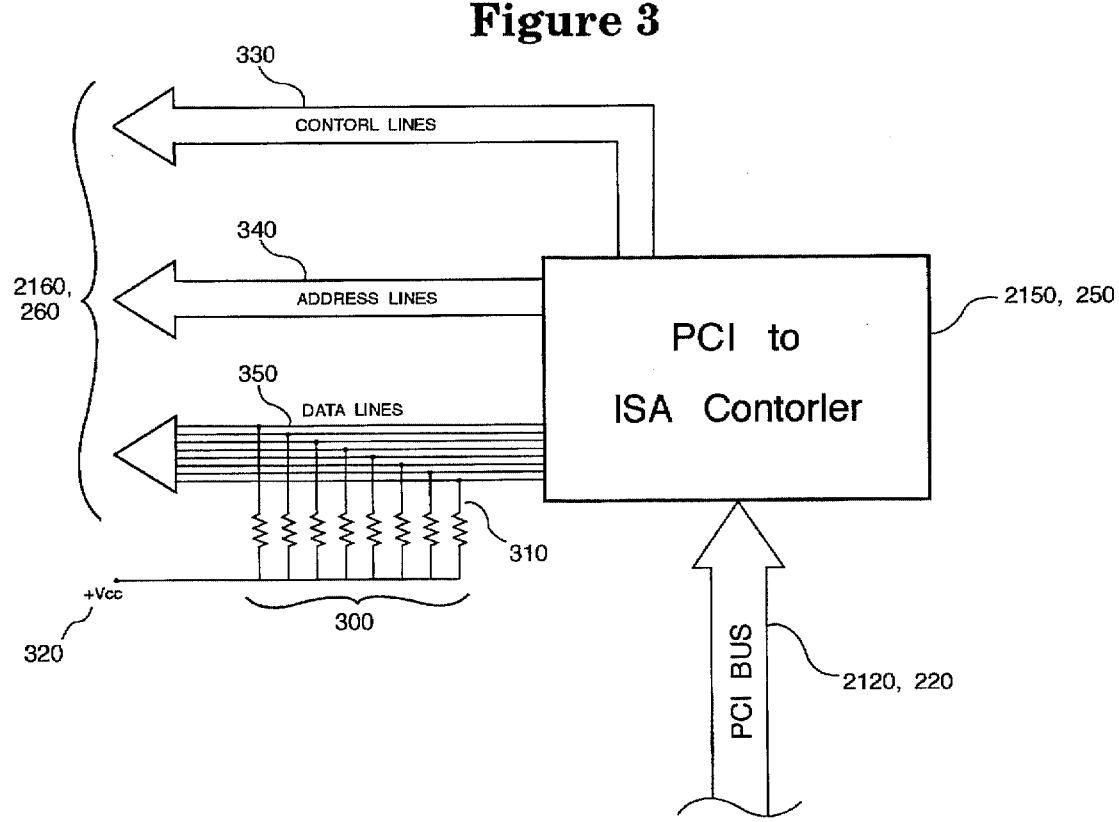
FIG. 3 is a block/schematic diagram illustrating one aspect of the apparatus of the present invention.

FIG. 3 is a block/schematic diagram illustrating one aspect of the apparatus of the present invention. For the sake of illustration, FIG. 3 illustrates this aspect of the present invention as applied to ISA controller 2150. However, it can be appreciated that the same or similar circuits may also be implemented in ISA controller 250 or other secondary ISA controllers.

In FIG. 3, ISA controller 2150 or 250 is coupled to PCI bus 2120 or 220 to receive and transmit address, data and commands (e.g., read/write). ISA controller 2150, 250 translates PCI data, addresses and commands into ISA bus data, addresses and commands and vice versa. ISA bus 2160, 260 may comprise control lines 330, address lines 340, and data lines 350 as is known in the art. Data lines 350 may comprise, for example, sixteen data lines. However for other types of bus architectures within the spirit and scope of the present invention, other numbers of data lines may be employed.

For each of ISA controller 2150 and 250 is provided a pull-up circuit 300. For the sake of illustration the pull-up circuit is shown external to ISA controller 2150 or 250. However, it can be appreciated that such a pull-Up circuit may be provided internal to ISA controller 2150 or 250. Pull-up circuit 300 may comprise a number of pull-up resistors 310, each coupled to a respective data line of data lines 350. For other bus types, an appropriate number of pull-up circuits may be provided. Pull-up circuit 300 is illustrated here as number of pull-up resistors 310 coupled to supply voltage $V_{CC}$ 320. It can be appreciated that in practice, a resistor may be impractical to implement in an integrated circuit and that pull-up circuit 3020 may be implemented using equivalent transistor technology.

Resistor 310 may take a value of 5 to 100 Kilo-Ohms. When no data is asserted on ISA bus 2160, pull-up circuit 300 pulls all data lines 350 to a high ($V_{CC}$) voltage state. Thus, when no device is driving data on ISA bus 2160 or 260, the value for data on the bus is binary 11111111 or FF hexadecimal. Resistors 310 act as a weak pull-up resistors. Thus, when a device on ISA bus 2160 or 260 drives data on to ISA bus 2160 or 260, the value of data on the bus changes accordingly. This change in data value may be utilized as a signal to indicate which of ISA buses 2160 or 260 contains the peripheral device to be addressed.

Each of ISA controllers 250 and 2150 may be provided with such a target peripheral device detection circuit to detect data transitions as the primary means of target detection. In addition, the signal IOCHRDY generated on each local ISA bus may also be monitored to contribute to determining when to terminate each PCI to ISA cycle. If a target peripheral device on one of ISA busses 2160 or 260 pulls signal IOCHRDY low, this signal indicates that the target device wants to extend the ISA bus cycle by adding wait states for as long as IOCHRDY remains low. If secondary ISA controller 250 sees IOCHRDY low, this information may be transmitted back to the primary ISA controller 2150 as sideband signal ISARDY to signal it to extend the PCI cycle beyond the standard ISA timeout. Both ISA controllers 2150 and 250 (primary and secondary) should drive the status of its collector driver with a pull-up resistor in order to allow multiple ISA controllers to share this function. Primary ISA controller 2150 may also treat the ISARDY signal as an input which it will use to determine when any ISA target device wants to exceed the ISA bus cycle.

Thus, although an ISA device does not provide an explicit indication to a host as to its presence as does a PCI device, it is nevertheless possible to detect the presence of an ISA device utilizing an inherent background feature of each prior art ISA device, the ability to drive data on an ISA bus.

The operation of the PCI bus cycle for a read cycle is similar to that of the write cycle discussed above. If a PCI read cycle times out (e.g., four clock cycles without a DEVSEL# signal) and no PCI device 2130, 2140, 230, 240 has claimed the cycle, then primary ISA controller 2150 may tentatively claim the cycle on behalf of all ISA controllers in the system (e.g., ISA controllers 2150, 250). Each ISA controller then executes the designated read cycle.

If any ISA device pulls low the IOCHRDY line, an indirect indication is given that the target peripheral device is present on that bus. The corresponding ISA controller (e.g., ISA controller 250) pulls low the ISARDY line to signal primary ISA controller 2150 not to terminate the cycle at ISA standard timeout. Primary ISA controller may detect the presence of a target peripheral device by monitoring the presence of signal IOCHRDY on its own ISA bus 2160. The ISA controller detecting the target peripheral device is then responsible for terminating the PCI cycle once the ISA cycle is complete.

If none of the IOCHRDY lines on ISA buses 2160, 260 have been pulled low, and if any data is sampled low at the end of the standard ISA read cycle (after being precharged high by pull-up circuit 300), an indirect indication is again made that the target peripheral device is present. Again, the ISA controller 2150 or 250 detecting the presence of the peripheral device is responsible for terminating the PCI cycle once the ISA cycle is complete. In the preferred embodiment, an active circuit may be used to create the precharge rather than the resistors illustrated in FIG. 3.

Figure 4:
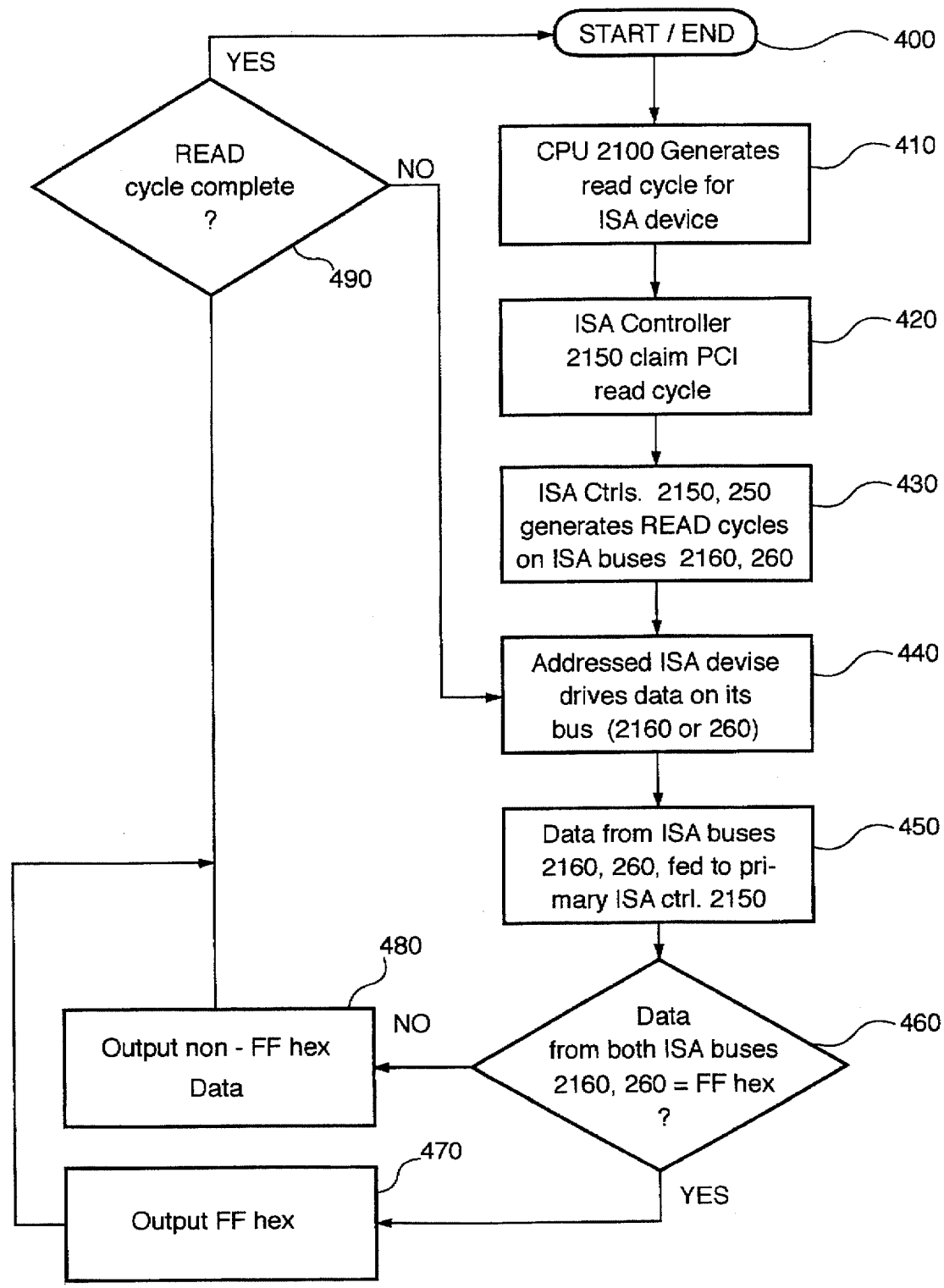
FIG. 4 illustrates the steps in reading data from the ISA buses of the apparatus of FIG. 2.

FIG. 4 illustrates the steps carried out in reading data from either ISA buses 2160 or 260. In step 410, CPU 2100 may generates read cycle intended for an ISA device on one of ISA buses 260 or 2160. As the read command is intended for an ISA device, none of PCI devices 2130, 2140, 230 or 240 should claim the cycle and the PCI write cycle times out (e.g., four clock cycles without a DEVSEL# signal). In step 420, primary ISA controller 2150 may tentatively claim the cycle on behalf of all ISA controllers in the system (e.g., ISA controllers 2150, 250).

In step 430, ISA controllers 2150 and 250, having received a ISA device read request, generate local ISA bus read cycles on their respective ISA buses 2160, 260 by generating a device address on the address lines of ISA buses 2160 and 260 and indicating a read cycle through control lines of ISA buses 2160 and 260.

Pull-up circuits 300 within each of ISA controller 2150 and 250 has pulled the data lines of ISA buses 2160 and 260 high. It is presumed for the sake of FIG. 4 that the device addressed is a valid ISA device (2170, 2180, 270, or 280) present on one of ISA buses 2160 and 260. Furthermore, it is presumed that the overall system is properly configured such that no two ISA devices (2170, 2180, 270, 280) have the same I/O address (device address conflict).

In step 440, the addressed ISA device drives data on the data lines of its respective bus in response to the address and read signals. Thus, one of ISA buses 2160 and 260 is driving valid data while the other is pulled high to FF hexadecimal. In step 450, data from ISA buses 2160 and 260 is fed to ISA controller 2150. In the case of data from ISA bus 260, this data is fed through ISA controller 250 to PCI bus 220 through PCI bridge 210 to PCI bus 2120 to ISA controller 2150.

In step 460, the data received from each bus is compared to the pull-up value (FF hexadecimal). If data on both ISA buses 2160 and 260 is FF hexadecimal, then FF hexadecimal is output from ISA controller 2150 to PCI bus 2120 as shown in step 470. If data on one of ISA buses 2160 and 260 is not FF hexadecimal, it is presumed that such bus is generating valid data and that data is output to PCI bus 2120 from ISA controller 2150.

ISA controller 2150 is designated as the "primary" ISA controller, whereas ISA controller 250 acts as a secondary or slave controller. For purposes of controlling and directing data to and from ISA buses 2160 and 260, ISA controller 2150 may receive data from ISA controller 250 through PCI bus 2120. ISA controller 2150 may then act as primary interface between ISA buses 2160 and 260 and CPU 2100. Centralizing control of ISA buses 2160 and 260 is one of the features of the present invention.

As illustrated in FIG. 4, ISA controller 2150 may determine which of ISA buses 2160 or 260 is coupled to the addressed device by monitoring on which of buses 2160 and 260 the data value changes from the pull-up value of FF hexadecimal. However, there is one case in which it may be difficult to determine which bus contains the addressed device. If the output data from the addressed device is FF hexadecimal, or if there is no target device present, ISA controller 2150 cannot determine which of ISA buses 2160 or 260 is coupled to the addressed device. In this instance, since the intended output data is FF hexadecimal, no decision is made as to which bus a device is coupled to and the resultant data (FF hexadecimal) is passed to PCI bus 2150.

Of course, the process of FIG. 4 assumes that a valid device at a particular address is coupled to one of ISA buses 2160 or 260. If no such device at that address is coupled to either of ISA buses 2160 or 260, the data output would remain at FF hexadecimal. Of course, a similar situation exists in a legacy type PC when a non-existent device is addressed. In a legacy type PC if a non-existent device is addressed, returned data will be FF as no device is present to drive the bus.

The apparatus and method of the present invention detects the presence of an ISA type device on one of two ISA buses by pulling up the data lines of each ISA bus to a high (FF hexadecimal) value and detecting a transition of the data liens on each bus to another data value. By utilizing this inherent feature of ISA devices, the apparatus and method of the present invention may be backward-compatible with legacy type PCs. Moreover, the apparatus and method of the present invention may be readily and economically implemented without an extensive amount of additional hardware.

In addition to detecting the presence of a peripheral device on an ISA bus and handling read and write cycles, additional features may be required to provide full ISA bus compatibility. In the ISA specification, ISA interrupt requests (IRQs) and direct memory access (DMA) are supported. Thus, for example, an ISA controller operating on a PCI bus must convert these requests into PCI compatible bus cycles or signals.

In order to maintain software compatibility with legacy systems and software, ISA controllers 2150 and 250 may each have the capability of emulating a pair of 8259 interrupt controllers upon which legacy systems are based. Both ISA controllers 2150 and 250 may be constructed as identical controllers and be configured either as "primary" or "secondary" ISA controllers in alternate configuration modes to allow them to operate either as primary or secondary controllers.

In this manner, ISA controllers 2150 and 250 may be constructed in an identical manner and then enabled into their primary and secondary roles. Such a technique reduces the number of different parts which may be needed to construct a multiple ISA bus system and may take advantage of the economies of scale in manufacturing by reducing the number of different parts which need to be constructed. Moreover, such a technique may be useful in reconfiguring primary ISA controller 2150 for use when it is not coupled to docking station 2000.

Each ISA controller (250, 2150) may be enabled as primary or secondary controller by sampling a predetermined input on power up and configuring itself accordingly. For example, a predetermined pin may be held high or low depending on whether the controller is to be configured as primary or secondary (e.g., low=secondary, high=primary). Upon power-up, this pin may be sampled and the ISA controller configured according to a internal program.

To maintain compatibility with legacy systems, there may be two 8259 type interrupt controllers contained within each of ISA controllers 250 and 2150. However, as applied to a multiple ISA bus system, it may be simpler to have only the pair of 8259 type interrupt controllers in primary ISA controller 2150 enabled. Interrupt requests (IRQs) from other ISA buses (e.g., bus 260) may be routed to the active pair of 8259 interrupt controllers in primary ISA controller 2150.

One requirement imposed by a multiple ISA system is that each interrupt line IRQn must be locatable on any ISA bus. In the present invention, this feature may be implemented by first defining a single enable bit per IRQ input. Each enable bit is then programmed into each PCI to ISA bus controller to indicate which controller has each active IRQ line. Note, however, that only one of each corresponding set of IRQs may be enabled at any time. Using this enable bit, all IRQ lines throughout the system may be sent back to the active interrupt controller pair in primary ISA controller 2150.

Figure 5:
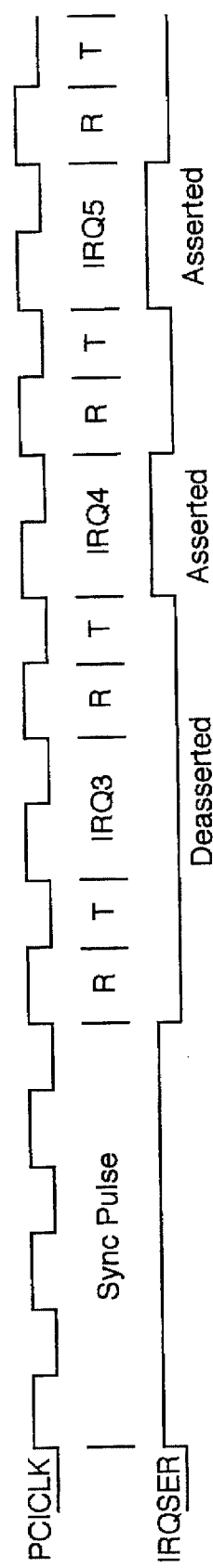
FIG. 5 is a timing diagram illustrating the operation of IRQ transmittal between ISA controllers.

These IRQ signals may be transmitted to primary ISA controller 2150 through another PCI sideband signal IRQSER. As signal IRQSER may comprise a single line, a data scheme such as that shown in FIG. 5 may be used to transmit IRQ requests through line IRQSER. FIG. 5 illustrates signals PCICLK and IRQSER. Signal PCICLK is the bus clock signal of the host PCI bus. As noted above, the PCI bus is a synchronous bus with its own internal clock signal. A secondary ISA controller such as ISA controller 250 may transmit on line IRQSER one or more pulses indicating which interrupt requests (IRQs) have been generated by peripheral devices 270, 280 on ISA bus 260.

The IRQ pulses may be generated after predetermined time intervals following an initial sync pulse which may be generate by primary ISA controller 2150. Thus, for example, if an IRQ level 3 is present on secondary ISA bus 260, a pulse may be generated by secondary ISA controller 260 during a first "window" after the sync pulse. IRQ level 4 may appear in a second "window" and so on. In the example shown in FIG. 5, IRQ levels 4 and 5 are present.

Note that the signalling technique of the present invention allows for multiple numbers of secondary ISA controllers and peripheral devices to be used directly on the IRQSER line. The resultant signal IRQSER may contain the sum total of all interrupt requests (IRQs) for all ISA peripheral devices on all buses. Primary ISA controller 2150 receives signal IRQSER as a PCI sideband signal and processes the interrupt requests, along with interrupt requests from its own ISA bus 2160, and passes these to CPU 2100 through as interrupt request signal INTR. Primary ISA controller 2150 may convert the sequential IRQSER pulse train into individual IRQ signals using a shift in register or the like. The resultant signals may then be combined with IRQ signals from the ISA bus 2160 of primary ISA controller 260.

In FIG. 5, the sync pulse may be driven high for three clock cycles and low for one clock cycle, followed by a one-half clock cycle tristate period. Following the sync pulse may be eleven IRQ time slots which may be driven by any controller on the IRQSER line. Each IRQ slot may comprise two PCI clock cycles.

The first clock cycle is the data drive time. During this clock cycle, the line may be driven high if an ISA controller detects its corresponding IRQ lines to be high. Otherwise, the controller leaves the line tristate. During the next clock period, known as the recovery period, the IRQSER line may be driven back low by the same device, only if it was previously driven high. During the final clock period, known as the turnaround period, all controllers leave the IRQSER line tristate. Similarly, the entire protocol could as well be inverted to use a high state as a default and drive low for data sampling. Turnaround (T) and recovery (R) periods are illustrated in FIG. 5.

Once the sequence has passed through all eleven IRQ time slots, primary controller 2150 may again drive a sync pulse to perpetuate the transfer of IRQ data. This scheme provides a maximum latency of 780 nS for any individual IRQ. A latching mechanism may be provided within each secondary ISA controller (e.g., secondary controller 250) to ensure that once any ISA IRQ input has been asserted it will then be latched until it is shifted back to primary controller 2150. The latching mechanism may insure that short pulses on IRQs are not lost between sampling periods.

Referring now to FIG. 2, PCI to PCI bridge 210 may comprise a simple coupler, or may also include additional buffering circuitry to buffer signals from PCI bridge 2120 to and from PCI bridge 220 such that all PCI bus signals, including the sideband signals of the present invention, are transferred between PCI buses 2120 and 220 and in effect from one PCI bus. If the signal IRQSER, for example, is buffered through the bridge, bridge 210 must drive the buffered IRQSER line only on high assertions as did the original source. Conversely, bridge 210 should leave the line tristate for any deasserted time slot in order assure that the IRQSER line remains sharable on the host side of bridge 210.

The IRQSER line should be left low by primary ISA controller 2150 if the PCICLK is stopped, however the clock control must be defined such that the clock may not stop if there is any interrupt pending. Then, if any ISA controller 2150,250 detects any of its IRQs asserted while PCICLK is stopped, it should force the IRQSER line high temporarily to signal primary ISA controller 2150 to restart PCICLK. This function may also be controlled through the PCI bus defined CLKRUN line.

A similar compatibility issue to IRQ handling arises concerning DMA control. Unlike the IRQ control, where control is centralized in primary ISA controller 2150, DMA control may be more efficiently handled in a decentralized manner. In a similar manner to the IRQ control scheme discussed above, one enable bit may be set in each ISA controller 2150,250 for each DMA channel enabled for that controller.

The enable bit selects which channels in each ISA controller 2150,250 may be active at any given time. Only one channel of each corresponding set may be enabled at any given time. For example, DMA channel 3 may only be enabled in one of ISA controllers 2150, 250 at any given time. In order to program all of the DMA controllers within each of ISA controllers 2150,250, all DMA configuration addresses should be broadcast to all ISA controllers 2150, 250 to write all corresponding DMA controllers in parallel.

If any DRQ (DMA request) is asserted to enabled DMA channel, the local ISA controller 2150,250 may act as a DMA master on the corresponding ISA bus 2150,250 to drive appropriate I/O and memory cycles to the corresponding ISA bus 2150,250 along with the appropriate memory address. The local ISA controller 250,2150 may then interpret the memory read or write command and generate an equivalent read or write cycle on PCI bus 2120,220 as a PCI master. Thus, direct memory access (DMA) from devices on ISA buses 2160,260 may be converted into ordinary read/write cycles on PCI bus 2120,220.

The read/write cycle is then handled as any other PCI bus cycle until the target memory device completes the PCI bus cycle. Finally, the local PCI to ISA controller 2150,250 may then complete the local DMA cycle. The local PCI to ISA controller may also need to deassert the IOCHRDY line to stall the DMA cycle until it receives an appropriate response from PCI bus 2120,220.

One complication of the distributed DMA control scheme is that there are some registers which may provide read status information on DMA activity in an ISA bus 2160,260. Furthermore, some registers read data simultaneously from different DMA channels. Thus, if different channels are enabled with different controllers, then data must be merged from different ISA controllers 2150,250 for a single read cycle.

This complication may be resolved by again referencing the DMA channel enable bits. For each DMA register data read that is channel specific, it should only be driven out if that channel is enabled. While any data for a channel which may not be enabled should be precharged to a default high value prior to the data transfer. During the data transfer, the data should be left tristate to allow other ISA controllers 2150,250 to drive out data lines as appropriate.

There may be an additional complication in a situation in which data lines may be commonly read simultaneously from different devices during a single bus cycle, for example for a floppy or hard disk drive controllers (FDD or HDD). Some data lines may be allocated to one device, and other data lines may be allocated to another device. Again, this situation may be resolved by providing a location select or enable bit.

While the preferred embodiment and various alternative embodiments of the invention have been disclosed and described in detail herein, it may be apparent to those skilled in the art that various changes in form and detail may be made therein without departing from the spirit and scope thereof.

In an alternative embodiment to enable selected merging, in many cases it may be possible to extend the target peripheral device detection scheme to the bit level. In other words, the detection scheme may be utilized to determine not only from which source to drive data for each given system address, but also to determine from which source to drive the bus for each bit. If unknowns exist in terms of which data need to be merged, this alternative embodiment may be a preferable scheme.

Similarly, in order to make provision for other potential cases of data merging it may also be useful to provide some number of programmable addresses which may be assigned as data merging locations along with programmable location selects for each data bit of given addresses.

For example, the apparatus and method of the present invention has been described for use in a dual ISA bus system where, for example, a portable computer may dock with a docking station. However, the apparatus and method of the present invention may be applied to other types of computer systems where multiple ISA or other passive bus types may be used. Moreover, the apparatus and method of the present invention may be applied to so-called "plug and play" systems where it may be desirable to identify different peripheral devices on a passive bus systems such as an ISA bus. For example, a CPU could be programmed to poll all device addresses on an ISA bus and then detect the presence of ISA devices by detecting the transition of the data lines on an ISA bus from FF hexadecimal to another data value.

In addition, while the pull-up circuit in the present invention has been described for pulling all data lines of a data bus high in the absence of any asserted data on the bus, it is entirely within the spirit and scope of the present invention to hold only one or more data lines high using a pull-up circuit. For example, a particular data line (e.g., LSB, MSB) may be selected on the basis that such a data line may characteristically go low when data is driven on the bus.

It should also be noted that while the present invention describes a pull-up circuit for use in detecting the presence of an ISA device on the bus, a pull-down circuit may also be used for similar effect. One or more data lines may be pulled low (i.e., to ground) in the absence of any data asserted on the bus. The ISA controller may then detect the presence of an ISA device on the bus by observing the transition from low to high of one or more data lines on the bus. Similarly, a number of data lines may be held high and a number held low (or a third number tristated) such that the detected value may take on a number other than FF hexadecimal.

Further, it should be noted that while the present invention is illustrated with two ISA buses 2160 and 260, other numbers of ISA uses and ISA controllers may be added to the system. Additional secondary controllers may be added, each communicating with primary ISA controller 2150 by generating sideband signal ISARDY on PCI bus 2120,220. Thus, the present invention may be expanded to include three or more ISA busses and corresponding controllers, as well as various peripheral controllers which could be directly connected to the PCI bus using the same mechanism.

What is claimed is:

1. A multiple bus computer system, comprising:

a first bus system of a first type for interfacing with a central processing unit;

a second bus system of a second type for transmitting data and control signals to and from at least one device;

a primary bus controller, coupled to said first bus system and said second bus system, for controlling the second bus system;

at least one third bus system of the second type, for transmitting data and control signals to and from at least one other device; and at least one secondary bus controller, coupled to said first bus system and said third bus system, for controlling the at least a third bus system, wherein said at least one secondary bus controller receives interrupt requests from said at least one third bus system over said first bus system and outputs an interrupt signal on said first bus system to said primary bus controller indicative of interrupt requests generated on said at least one third bus system.

2. A multiple bus computer system, comprising:

a first bus system of a first type for interfacing with a central processing unit;

a second bus system of a second type for transmitting data and control signals to and from at least one device;

a primary bus controller, coupled to said first bus system and said second bus system, for controlling the second bus system;

at least one third bus system of the second type, for transmitting data and control signals to and from at least one other device; and at least one secondary bus controller, coupled to said first bus system and said third bus system, for controlling the at least a third bus system, wherein said at least one secondary bus controller receives interrupt requests from said at least one third bus system and outputs an interrupt signal on said first bus system to said primary bus controller indicative of interrupt requests generated on said at least one third bus system, and wherein said primary bus controller receives said interrupt signal over said first bus system and further receives interrupt requests from said second bus system and outputs a signal on said first bus system indicative of all interrupt requests on said second bus system and said at least one third bus system.

3. The multiple bus computer system of claim 2 wherein said interrupt signal comprises one or more pulses the timed relationship of which indicates the presence of an interrupt request level.

4. The multiple bus computer system of claim 3 wherein said primary bus controller further comprises:

sync pulse generating means, for generating a sync pulse on interrupt signal line on an said first bus system.

5. A multiple bus computer system, comprising:

a first bus system of a first type for interfacing with a central processing unit;

a second bus system of a second type for transmitting data and control signals to and from at least one device;

a primary bus controller, coupled to said first bus system and said second bus system, for controlling the second bus system;

at least one third bus system of the second type, for transmitting data and control signals to and from at least one other device; and at least one secondary bus controller, coupled to said first bus system and said third bus system, for controlling the at least a third bus system, wherein said at least one secondary bus controller receives interrupt requests from said at least one third bus system and outputs an interrupt signal on said first bus system to said primary bus controller indicative of interrupt requests generated on said at least one third bus system, and wherein said at least one secondary bus controller further comprises:

masking means, for providing a bit mask indicating which of a number of interrupt request levels are enabled for said at least one secondary bus controller, wherein said at least one secondary bus controller receives interrupt requests from said at least one third bus system and generates an interrupt signal on said first bus system for those interrupt levels enabled by said masking means.

6. A multiple bus computer system, comprising:

a first bus system of a first type for interfacing with a central processing unit;

a second bus system of a second type for transmitting data and control signals to and from at least one device;

a primary bus controller, coupled to said first bus system and said second bus system, for controlling the second bus system;

at least one third bus system of the second type, for transmitting data and control signals to and from at least one other device; and at least one secondary bus controller, coupled to said first bus system and said third bus system, for controlling the at least a third bus system, wherein said at least one secondary bus controller receives interrupt requests from said at least one third bus system and outputs an interrupt signal on said first bus system to said primary bus controller indicative of interrupt requests generated on said at least one third bus system, and wherein said primary bus controller further comprises:

masking means, for providing a bit mask indicating which of a number of interrupt request levels are enabled for said primary bus controller, wherein said primary bus controller receives interrupt requests from said second bus system and combines those interrupt requests enabled by said masking means with interrupt requests received from said interrupt signal to produce a combined interrupt signal representing enabled interrupt requests for all bus systems of the second type in said multiple bus computer system.

7. The multiple bus computer system of claim 6, wherein said primary bus controller further comprises:

means for outputting said combined interrupt signal to said first bus system.

8. The multiple bus computer system of claim 7, wherein said at least one secondary bus controller further comprises:

sync pulse receiving means, for receiving said sync pulse on an interrupt signal line and for generating pulses indicative of interrupt requests on said at least one third system bus in timed relationship to said sync pulse.

9. A multiple bus computer system, comprising:

a first bus system of a first type for interfacing with a central processing unit;

a second bus system of a second type for transmitting data and control signals to and from at least one device;

a primary bus controller, coupled to said first bus system and said second bus system, for controlling the second bus system;

at least one third bus system of the second type, for transmitting data and control signals to and from at least one other device; and at least one secondary bus controller, coupled to said first bus system and said third bus system, for controlling the at least a third bus system, wherein said at least one secondary bus controller receives interrupt requests from said at least one third bus system and outputs an interrupt signal on said first bus system to said primary bus controller indicative of interrupt requests generated on said at least one third bus system, wherein said primary bus controller further comprises masking means, for providing a bit mask indicating which of a number of direct memory access channels are enabled for said primary bus controller, and wherein said primary controller receives direct memory access requests from said second bus system and generates a read or write cycle on said first bus system corresponding to output requests enabled by said masking means.

10. A multiple bus computer system, comprising:

a first bus system of a first type for interfacing with a central processing unit;

a second bus system of a second type for transmitting data and control signals to and from at least one device;

a primary bus controller, coupled to said first bus system and said second bus system, for controlling the second bus system;

at least one third bus system of the second type, for transmitting data and control signals to and from at least one other device; and at least one secondary bus controller, coupled to said first bus system and said third bus system, for controlling the at least a third bus system, wherein said at least one secondary bus controller receives interrupt requests from said at least one third bus system and outputs an interrupt signal on said first bus system to said primary bus controller indicative of interrupt requests generated on said at least one third bus system, wherein said at least one secondary bus controller further comprises masking means, for providing a bit mask indicating which of a number of direct memory access channels are enabled for said at least one secondary bus controller, and wherein said at least one secondary bus controller receives direct memory access requests from said at least one third bus system and generates a read or write cycle on said first bus system corresponding to output requests enabled by said masking means.

11. A method of controlling multiple bus systems in a multiple bus computer system including a first bus system of a first type, a second bus system of a second type, a primary bus controller coupled to the first bus system and the second bus system for controlling the second bus system, at least one third bus system of the second type, and at least one secondary bus controller for controlling the at least a third bus system, said method comprising the steps of:

receiving interrupt requests from the at least third bus system over said first bus system in the at least one secondary controller;

generating an interrupt signal on the first bus system indicative of received interrupt requests;

receiving interrupt requests from the second bus system in the primary bus controller;

combining received interrupt requests from the second bus system with the interrupt signal to produce a combined interrupt signal indicative of all interrupt requests for bus systems of the second type; and outputting the combined interrupt signal to the first bus system.

12. A method of controlling multiple bus systems in a multiple bus computer system including a first bus system of a first type, a second bus system of a second type, a primary bus controller coupled to the first bus system and the second bus system for controlling the second bus system, at least one third bus system of the second type, and at least one secondary bus controller for controlling the at least a third bus system, said method comprising the steps of:

receiving interrupt requests from the at least third bus system in the at least one secondary controller;

generating an interrupt signal on the first bus system indicative of received interrupt requests;

receiving interrupt requests from the second bus system in the primary bus controller;

combining received interrupt requests from the second bus system with the interrupt signal to produce a combined interrupt signal indicative of all interrupt requests for bus systems of the second type;

outputting the combined interrupt signal to the first bus system; and masking the received interrupt requests in the at least one secondary bus controller with a bit mask indicating enabled interrupt request levels for the at least one third bus system.

13. A method of controlling multiple bus systems in a multiple bus computer system including a first bus system of a first type, a second bus system of a second type, a primary bus controller coupled to the first bus system and the second bus system for controlling the second bus system, at least one third bus system of the second type, and at least one secondary bus controller for controlling the at least a third bus system, said method comprising the steps of:

receiving interrupt requests from the at least third bus system in the at least one secondary controller;

generating an interrupt signal on the first bus system indicative of received interrupt requests;

receiving interrupt requests from the second bus system in the primary bus controller;

combining received interrupt requests from the second bus system with the interrupt signal to produce a combined interrupt signal indicative of all interrupt requests for bus systems of the second type;

outputting the combined interrupt signal to the first bus system; and masking the received interrupt requests in the primary bus controller with a bit mask indicating enabled interrupt request levels for the second bus system.

14. A method of controlling multiple bus systems in a multiple bus computer system including a first bus system of a first type, a second bus system of a second type, a primary bus controller coupled to the first bus system and the second bus system for controlling the second bus system, at least one third bus system of the second type, and at least one secondary bus controller for controlling the at least a third bus system, said method comprising the steps of:

receiving interrupt requests from the at least third bus system in the at least one secondary controller;

generating an interrupt signal on the first bus system indicative of received interrupt requests;

receiving interrupt requests from the second bus system in the primary bus controller;

combining received interrupt requests from the second bus system with the interrupt signal to produce a combined interrupt signal indicative of all interrupt requests for bus systems of the second type; and outputting the combined interrupt signal to the first bus system, wherein said step of generating an interrupt signal on the first bus system comprises the steps of:

generating, with the primary controller, a sync pulse on an interrupt request line on the first bus system;

receiving the sync pulse in at least one of the at least one secondary controllers; and generating, in response to an interrupt request generated on at least one of the at least one third bus systems, at least one interrupt pulse on the interrupt request line, the at least one interrupt pulse having a timed relationship to the sync pulse indicating a level of the at least one interrupt request generated on the at least one of the at least one third bus.

15. A method of controlling multiple bus systems in a multiple bus computer system including a first bus system of a first type, a second bus system of a second type, a primary bus controller coupled to the first bus system and the second bus system for controlling the second bus system, at least one third bus system of the second type, and at least one secondary bus controller for controlling the at least a third bus system, said method comprising the steps of:

receiving interrupt requests from the at least third bus system in the at least one secondary controller;

generating an interrupt signal on the first bus system indicative of received interrupt requests;

receiving interrupt requests from the second bus system in the primary bus controller;

combining received interrupt requests from the second bus system with the interrupt signal to produce a combined interrupt signal indicative of all interrupt requests for bus systems of the second type;

outputting the combined interrupt signal to the first bus system;

providing a bit mask in the primary bus controller indicating which of a number of direct memory access channels are enabled for the primary bus controller;

receiving direct memory access requests from the second bus system; and generating a read or write cycle on the first bus system corresponding to output requests enabled by the bit mask.

16. A method of controlling multiple bus systems in a multiple bus computer system including a first bus system of a first type, a second bus system of a second type, a primary bus controller coupled to the first bus system and the second bus system for controlling the second bus system, at least one third bus system of the second type, and at least one secondary bus controller for controlling the at least a third bus system, said method comprising the steps of:

receiving interrupt requests from the at least third bus system in the at least one secondary controller;

generating an interrupt signal on the first bus system indicative of received interrupt requests;

receiving interrupt requests from the second bus system in the primary bus controller;

combining received interrupt requests from the second bus system with the interrupt signal to produce a combined interrupt signal indicative of all interrupt requests for bus systems of the second type;

outputting the combined interrupt signal to the first bus system;

providing a bit mask indicating which of a number of direct memory access channels are enabled for said at least one secondary bus controller;

receiving direct memory access requests from the at least one third bus system; and generating a read or write cycle on the first bus system corresponding to output requests enabled by the masking means.

17. A multiple bus computer system, comprising:

a first bus system of a first type for interfacing with a central processing unit;

a second bus system of a second type for transmitting data and control signals to and from at least one device;

a primary bus controller, coupled to said first bus system and said second bus system, for controlling the second bus system, said primary bus controller including an interrupt controller;

at least one third bus system of the second type, for transmitting data and control signals to and from at least one other device; and at least one secondary bus controller, coupled to said first bus system and said third bus system, for controlling the at least a third bus system, wherein said at least one secondary bus controller receives interrupt requests from said at least one third bus system and outputs the interrupt requests to said primary bus controller indicative of interrupt requests generated on said at least one third bus system.

18. A method of controlling multiple bus systems in a multiple bus computer system including a first bus system of a first type, a second bus system of a second type, a primary bus controller coupled to the first bus system and the second bus system for controlling the second bus system, the primary bus controller including an interrupt controller, at least one third bus system of the second type, and at least one secondary bus controller for controlling the at least a third bus system, said method comprising the steps of:

receiving interrupt requests from the at least third bus system in the at least one secondary controller;

transmitting the interrupt requests from the at least third bus system to the primary bus controller;

receiving interrupt requests from the second bus system in the primary bus controller;

combining received interrupt requests from the second bus system with interrupt requests from the at least third bus system to produce a combined interrupt signal indicative of all interrupt requests for bus systems of the second type; and outputting the combined interrupt signal to the first bus system.

* * * * *